US008678346B2

(12) United States Patent
Haller

(10) Patent No.: US 8,678,346 B2
(45) Date of Patent: Mar. 25, 2014

(54) NEAR-FIELD WIRELESS POWERED SOLENOID VALVE

(75) Inventor: John J. Haller, Boonton, NJ (US)

(73) Assignee: Automatic Switch Company, Florham Park, NJ (US)

( * ) Notice: Subject to any disclaimer, the term of this patent is extended or adjusted under 35 U.S.C. 154(b) by 290 days.

(21) Appl. No.: 13/153,926

(22) Filed: Jun. 6, 2011

(65) Prior Publication Data

US 2012/0305096 A1 Dec. 6, 2012

(51) Int. Cl.
*F16K 31/02* (2006.01)

(52) U.S. Cl.
USPC ............ 251/129.04; 251/129.01; 251/129.15

(58) Field of Classification Search
USPC ................ 251/30.01, 129.01–129.05, 129.15
See application file for complete search history.

(56) References Cited

U.S. PATENT DOCUMENTS

| | | | | | |
|---|---|---|---|---|---|
| 4,948,090 | A | * | 8/1990 | Chen | 251/30.03 |
| 5,121,511 | A | | 6/1992 | Sakamoto et al. | |
| 5,734,254 | A | * | 3/1998 | Stephens | 320/106 |
| 6,040,986 | A | * | 3/2000 | Sakamoto et al. | 363/21.02 |
| 6,301,128 | B1 | * | 10/2001 | Jang et al. | 363/17 |
| 6,359,267 | B1 | * | 3/2002 | Wilcox et al. | 219/615 |
| 6,436,299 | B1 | * | 8/2002 | Baarman et al. | 210/748.09 |
| 6,504,318 | B1 | * | 1/2003 | Pienisaari | 315/242 |
| 6,844,702 | B2 | * | 1/2005 | Giannopoulos et al. | 320/108 |
| 7,212,414 | B2 | * | 5/2007 | Baarman | 363/16 |
| 2004/0145342 | A1 | * | 7/2004 | Lyon | 320/108 |
| 2005/0127869 | A1 | | 6/2005 | Calhoon et al. | |
| 2007/0021140 | A1 | | 1/2007 | Keyes, IV et al. | |
| 2007/0228071 | A1 | * | 10/2007 | Kamen et al. | 222/52 |
| 2008/0245422 | A1 | | 10/2008 | McTargett | |
| 2008/0265835 | A1 | | 10/2008 | Reed et al. | |
| 2010/0294373 | A1 | * | 11/2010 | Haller et al. | 137/1 |
| 2011/0049997 | A1 | | 3/2011 | Urano | |

FOREIGN PATENT DOCUMENTS

| | | |
|---|---|---|
| CA | 2 552 849 | 1/2007 |
| CA | 2 628 301 | 4/2008 |
| EP | 1 591 670 | 11/2005 |
| EP | 1647751 | 4/2006 |
| EP | 2 293 411 | 3/2011 |
| GB | 2 428 915 | 2/2007 |
| GB | 2 472 700 | 2/2011 |
| GB | 2 472 704 | 2/2011 |
| WO | 2009/149464 | 12/2009 |

OTHER PUBLICATIONS

International Search Report for International Patent Application No. PCT/US2012/038677, dated Jul. 30, 2012, European Patent Office.
Written Opinion for for International Patent Application No. PCT/US2012/038677, dated Jul. 30, 2012, European Patent Office.

(Continued)

*Primary Examiner* — John K Fristoe, Jr.
*Assistant Examiner* — Matthew W Jellett
(74) *Attorney, Agent, or Firm* — Locke Lord LLP

(57) ABSTRACT

A solenoid valve assembly including a process control valve plumbed within a hazardous environment; a solenoid coil mated to the valve and configured to operate the valve, the solenoid coil located within the hazardous environment; a valve coil configured to receive power and transfer that power to the solenoid coil, thereby operating the valve, the valve coil located within the hazardous environment; and a controller coil configured to transmit power to the valve coil, the controller coil located in the hazardous environment.

18 Claims, 5 Drawing Sheets

(56) References Cited

OTHER PUBLICATIONS

Kajima, T., "Development of a High-Speed Solenoid Valve—Investigation of the Energizing Circuits", IEEE Transactions on Industrial Electronics, vol. 40, No. 4, Aug. 1993, pp. 428-435.

Waffenschmidt, E., "Resonant Coupling", Philips Research, Wireless Power Consortium, [retrieved from the Internet on Jul. 25, 2011 using <URL: http://www.wirelesspowerconsortium.com/technology/resonant-coupling.html>].

* cited by examiner

NEAR-FIELD WIRELESS POWERED SOLENOID VALVE

CROSS REFERENCE TO RELATED APPLICATIONS

None.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to solenoid operated valves; and more specifically relate to solenoid operated valves that may be used in hazardous or sensitive environments.

2. Description of the Related Art

U.S. Patent Application No. 20080245422 discloses a "fluid delivery apparatus includes a fluid outlet located on a first side of a barrier and at least one electrically powered component located on a second side of the barrier. The apparatus also includes a wireless power transfer device to supply power to the electrically powered component."

The inventions disclosed and taught herein are directed to an improved system for operating solenoid valves in hazardous or sensitive environments.

BRIEF SUMMARY OF THE INVENTION

A valve assembly of the present invention may be installed by plumbing a solenoid operated process control valve within a hazardous environment; and wiring the valve assembly to a controller outside of the hazardous environment, with components of the valve assembly being configured to communicate data signals and/or power wirelessly. This configuration allows for removal of the process control valve from the hazardous environment without disconnecting the controller or otherwise inhibiting power to the controller.

DETAILED DESCRIPTION OF THE INVENTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a valve assembly that may be installed by plumbing a solenoid operated process control valve within a hazardous environment; and wiring the valve assembly to a controller outside of the hazardous environment, with components of the valve assembly being configured to communicate data signals and/or power wirelessly. This configuration allows for removal of the process control valve from the hazardous environment without disconnecting the controller or otherwise inhibiting power to the controller.

Figure 1:
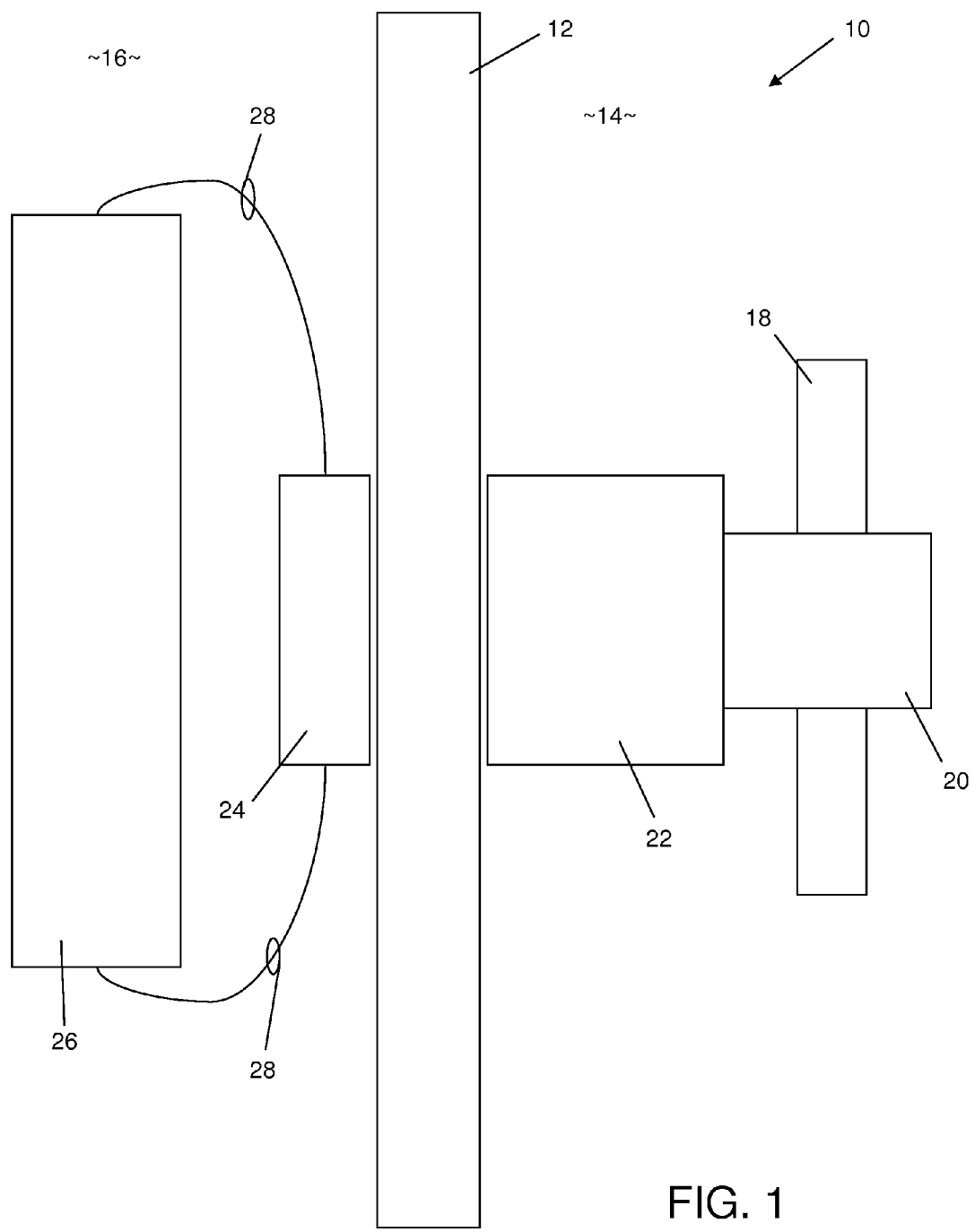
FIG. 1 illustrates a simplified block diagram of a particular embodiment of a valve assembly utilizing certain aspects of the present inventions.

FIG. 1 is an illustration of a valve assembly 10 utilizing certain aspects of the present invention. The valve assembly 10 preferably spans a barrier 12. The barrier 12 is preferably vapor tight when used to separate a hazardous environment 14 from a safe environment 16, such as when the valve assembly 10 is used in refineries, chemical plants, or the like. More specifically, in these cases, the barrier 12 preferably contain liquid and/or hazardous gases within the hazardous environment 14 or otherwise prevents transmission of liquid and/or hazardous gases from the hazardous environment 14 to the safe environment 16. As will be described in more detail the valve assembly 10 of the present invention is fully functional through the barrier, without requiring any penetrations in the barrier, such as those traditionally used to run wires to control prior art valves.

The valve assembly 10 of the present invention may be used to selectively control the flow of liquid or gas, such as that within process control plumbing or tubing 18. Such tubing 18 is generally used to control production or refining processes and may contain hazardous liquid and/or gases. In some cases, the tubing 18 may contain inert liquid and/or gases but may still be operating in an otherwise hazardous, high pressure, and/or environmentally sensitive environment.

In order to selectively control the flow of liquid or gas, the valve assembly 10 preferably includes a control valve 20, to which the tubing 18 would normally be plumbed. Because the tubing 18 is generally used in the hazardous environment 14, the valve is also typically plumbed to the tubing 18 in the hazardous environment 14. In order to control the valve 20, the valve assembly 10 preferably includes a valve driver 22. As will be described in more detail below, the valve driver 22 is preferably selectively energized by a controller driver 24 which is preferably positioned on an opposing side of the barrier 12, such as in a second or safe environment 16. The controller driver 24 may include, or may simply be used in connection with, a controller 26, such as a programmable logic controller (PLC) or other industrial process control system. More specifically, the controller driver 24 is preferably electrically coupled to, such as through wiring 28 and/or integration with, the controller 26. The controller driver 24 may be powered by, or through, the controller 26 or may be independently powered from a separate power source.

Figure 2:
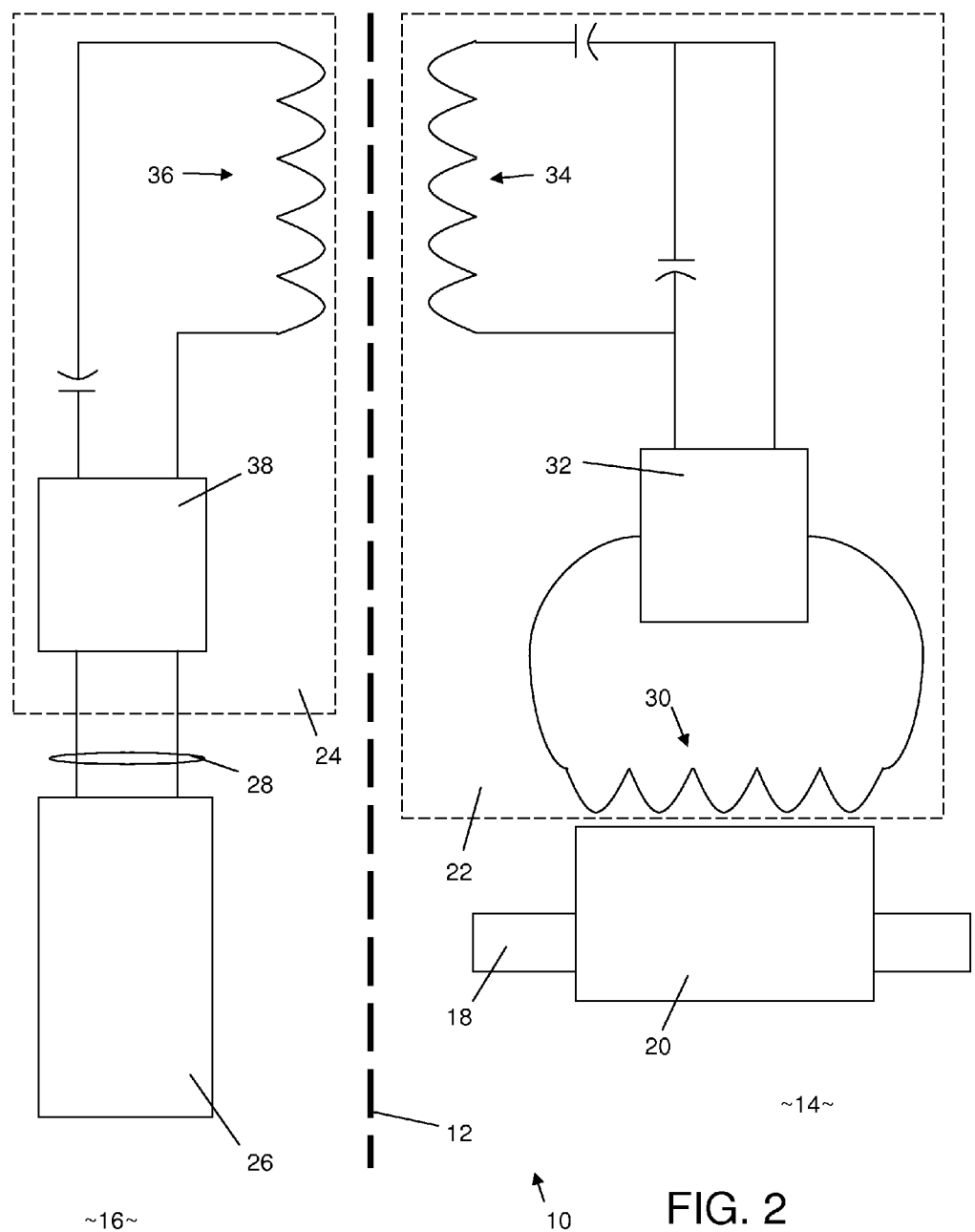
FIG. 2 illustrates a simplified schematic of certain components of the valve assembly of FIG. 1.

Referring also to FIG. 2, in one preferred embodiment, the valve driver 22 includes a solenoid coil 30 that generates a field when energized to selectively operate the valve 20. Of course, the valve 20 may be a normally closed valve, such that energizing the solenoid coil 30 opens the valve 20, or a normally open valve, such that energizing the solenoid coil 30 closes the valve 20.

In the preferred embodiment, the solenoid coil 30 is supplied by a rectifier 32, which is supplied by a valve coil 34. Current flow is selectively induced in the valve coil 34, through the barrier 12, by a controller coil 36. The controller 26 selectively energizes the controller coil 36 through an inverter 38.

Typical solenoid coils that are commonly used in process control applications normally operate on direct current (DC). Similarly, typical PLCs and other industrial process control systems also operate on DC. However, in order to achieve inductive coupling between the controller coil 36 and the valve coil 34, through the barrier 12, alternating current is needed. Therefore, the valve assembly 10 of the present invention utilizes the inverter 38 to invert DC received from the controller 26, when operation of the valve 18 is desired, into AC for inductive coupling between the controller coil 36 and the valve coil 34, through the barrier 12. The valve assembly 10 of the present invention also preferably utilizes the rectifier 32 to rectify the AC received from the valve coil 34 into DC, which is then supplied to the solenoid coil 30 to selectively operate the valve 20.

In an alternative embodiment, the controller 26 may generate a control signal using AC, which may then be more directly supplied to the controller coil 36, thereby potentially eliminating the inverter 38. Additionally, or alternatively, the solenoid coil 30 may be configured to selectively operate the valve 20 using AC, thereby potentially eliminating the rectifier 32.

Figure 3:
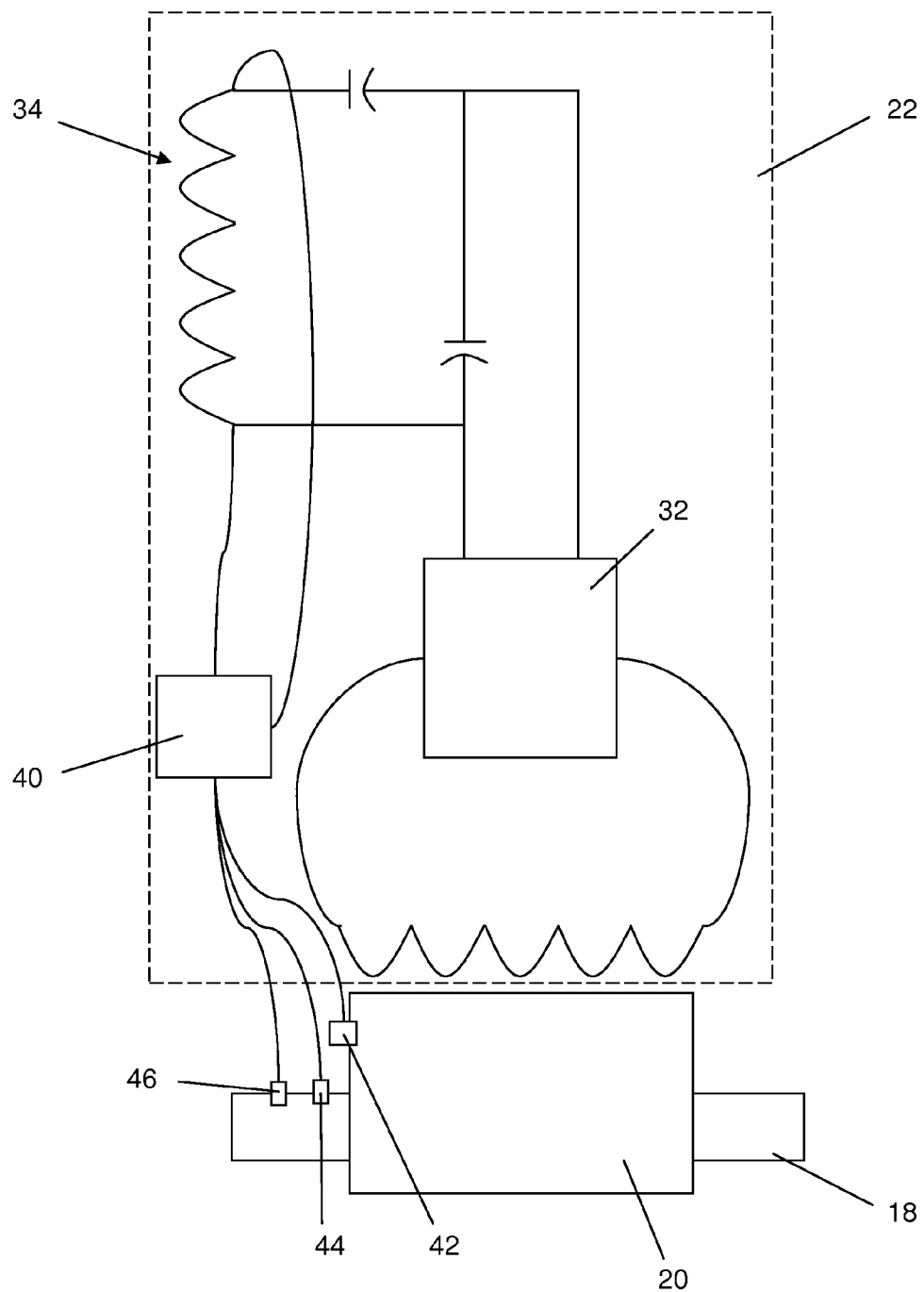
FIG. 3 illustrates a simplified schematic of an alternatively embodiment of certain components of the valve assembly of FIG. 1.

Referring also to FIG. 3, the valve assembly 10 may include sensors and logic that may be useful to the controller 26, or the overall process control system. For example, the valve driver 22 may include a microprocessor 40 and one or more sensors, such as a position sensor 42, a temperature sensor 44, and/or a flow rate sensor 46. The position sensor 42 may indicate the position of the valve 20, such as whether the valve 20 is open, closed, or in transition. The temperature sensor 44 may indicate the temperature of the valve 20, the tubing 18, and/or the process control fluid, or gas, flowing through the valve 20 or the tubing 18. The flow rate sensor 46 may indicate the rate at which the process control fluid, or gas, is flowing through the valve 20 or the tubing 18. If course, the flow rate sensor 46 may be used in place of the position sensor 42 as the flow rate information would also be indicative of the position of the valve 20.

In any case, the microprocessor 40 may monitor the sensors and generate a data signal indicative of the input from the sensors and transmit that data signal back to the controller driver 24 through the valve coil 34 and controller coil 36. For example, the microprocessor 40 may generate the data signal as a high frequency series of pulses and overlay the data signal on the AC of the valve coil 34, and in so doing inductively couple the data signal onto the controller coil 36, where the data signal may be communicated to the controller 26. For example, the controller 26 may be directly connected to the controller coil 36, or the inverter 38 may be configured to pass the data signal to the controller 26.

Figure 4:
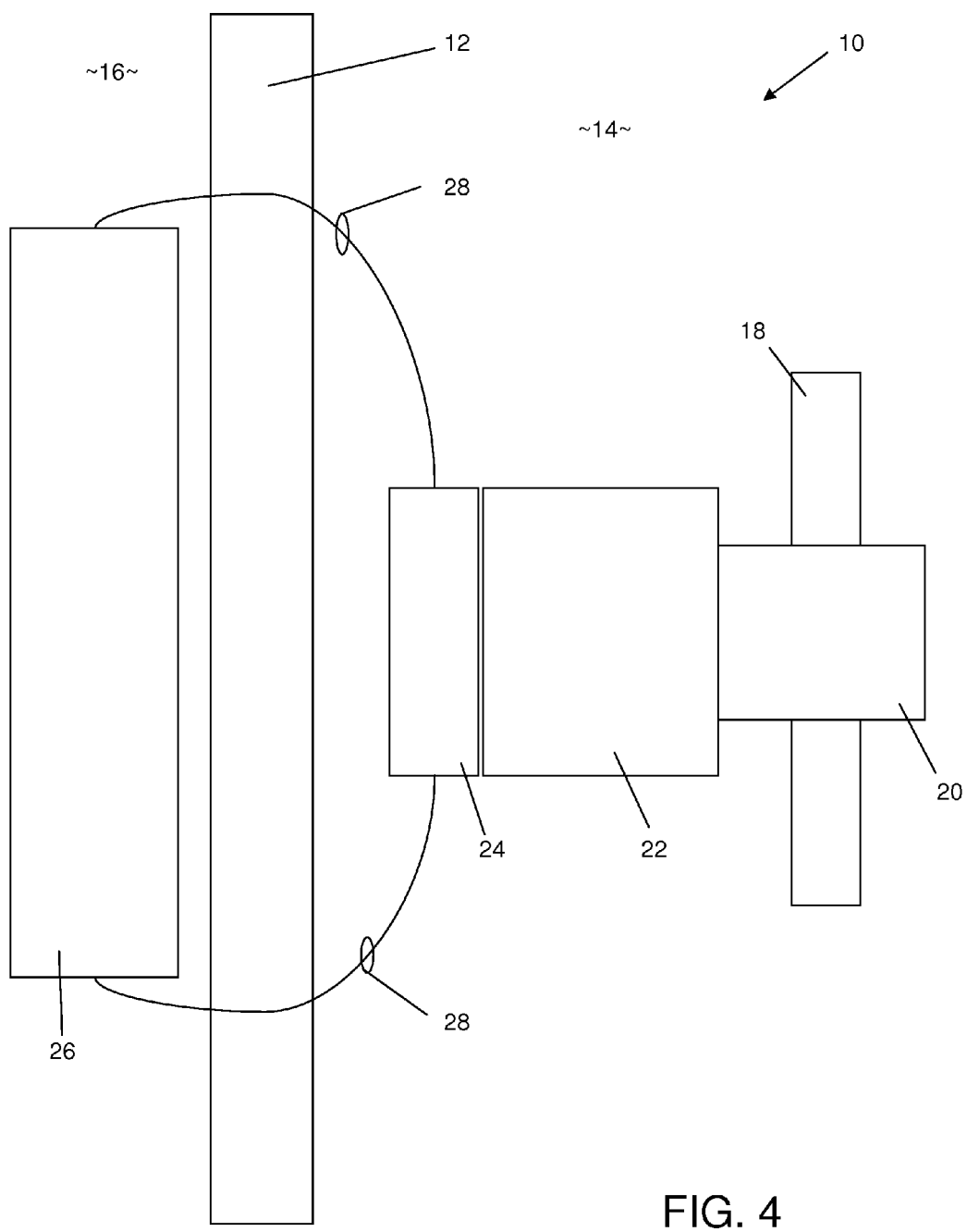
FIG. 4 illustrates a simplified block diagram of an alternative particular embodiment of a valve assembly utilizing certain aspects of the present inventions.
Figure 5:
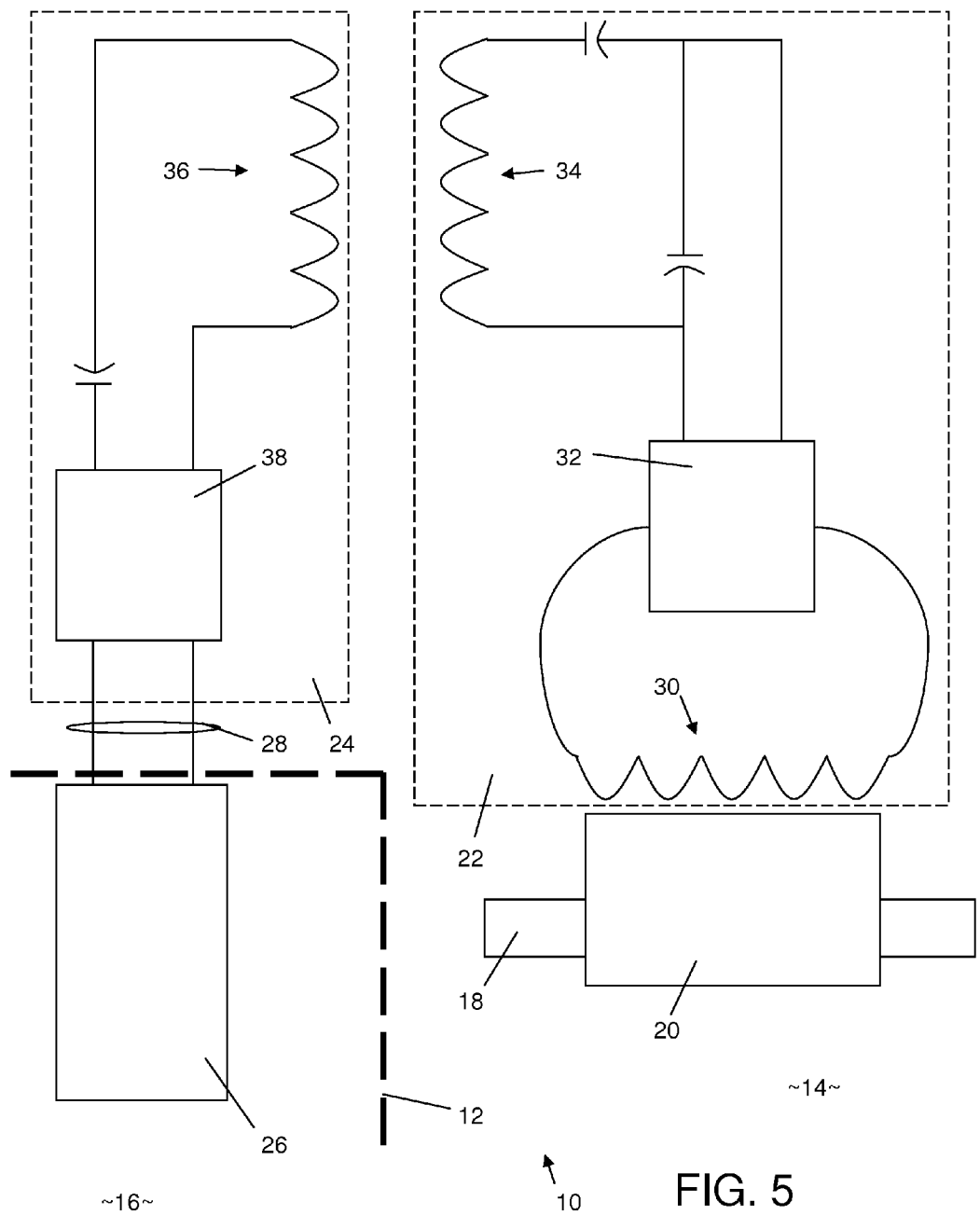
FIG. 5 illustrates a simplified schematic of certain components of the valve assembly of FIG. 4.

Referring also to FIG. 4 and FIG. 5, the controller driver 24 may be located in the hazardous environment 14 as well. I this case the wiring 28 and/or integration with the controller 26 would be expected to be rated for the environment 14. Because there would be no physical connection between the wiring 28 and the valve 20, the valve 20 would still be removable without disconnecting the controller driver 24 from its power source and/or the controller 26.

It can be seen that the present invention thus provides a better solution to the problem of connection of solenoid valves in hazardous environments and/or environments that require better isolation from moisture or other substances. Typical installations using solenoid valves in these environments require the coil of the solenoid be connected to the electrical supply system through threaded rigid conduit, or other means of excluding potentially explosive gases, excessive moisture or submersion or high pressure liquids which may penetrate the electrical connection and either damage it or pose an ignition threat. The servicing of these valves in these installations is currently difficult, since there is normally extensive disassembly necessary to remove the valve from service. In the case of hazardous environments, the electrical power needs to shut down to the area before disconnecting the equipment.

The present invention solves this problem by the elimination of any direct electrical connection to the solenoid coil 30 and replacing it with a near field high frequency resonant inductive coupling to supply power to the solenoid coil 30. The technique involves close coupling of the power source or controller driver 24 to the valve driver 22 through a pair coils operating with a high frequency AC signal. The controller coil 36 is positioned in close proximity, either on the same side or an opposition side of the barrier 12, to a companion valve coil 34 preferably located in the valve driver 22 containing the solenoid coil 30. The energy to operate the valve 20 is supplied without any direct, wired connection to the source of supply. This energy may be communicated across the barrier 12 either through a wired or wireless connection. However, since there is no direct, wired electrical connection to the solenoid coil 30 operating the valve 20, the valve assembly 10 can now be sealed more effectively and individual components, such as the valve 20, may be selectively removed without disconnection from the power source without fear of creating an ignition source or opening the circuit, or wiring 28, to the hazardous environment 14. This facilitates easy servicing and replacement and simplified installation of the valve assembly 10 and/or individual components thereof.

Other and further embodiments utilizing one or more aspects of the inventions described above can be devised without departing from the spirit of Applicant's invention. Further, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of controlling a process flow in a hazardous environment, comprising:
   plumbing a process control valve assembly within the hazardous environment, the hazardous environment being physically isolated from a non-hazardous environment by a vapor tight barrier such that no fluid or gas flowing through the process control valve assembly crosses through the barrier, the process control valve assembly including a solenoid operated valve, a solenoid coil, and one or more sensors;
   providing power inductively to the process control valve assembly from the non-hazardous environment;
   receiving data signals inductively from the one or more sensors of the process control valve assembly in the non-hazardous environment, the data signals containing information pertaining to an operation of the process control valve assembly; and
   using a controller in the non-hazardous environment to control operation of the solenoid operated valve inductively in response to the data signals inductively received from the one or more sensors.

2. The method of claim 1, wherein plumbing the control valve assembly includes physically plumbing the control valve assembly to tubing inside of the hazardous environment.

3. The method of claim 1, wherein the one or more sensors include one or more of: a valve position sensor, a flow temperature sensor, and a flow rate sensor.

4. The method of claim 3, wherein the signals are a series of high-frequency pulses.

5. The method of claim 1, further comprising removing the solenoid operated valve from the hazardous environment without inhibiting power to the process control valve assembly.

6. The method of claim 1, further including the steps of:
   positioning a valve coil adjacent a barrier of the hazardous environment and inside of the hazardous environment; and
   positioning a controller coil adjacent the barrier, outside of the hazardous environment, and opposite the barrier from the valve coil.

7. The method of claim 1, further including energizing the controller coil, thereby inducing current flow in the valve coil, thereby opening the valve or closing the valve.

8. The method of claim 1, further including the steps of:
   positioning a valve coil inside of the hazardous environment, the valve coil being wired to the solenoid coil; and
   positioning a controller coil adjacent the valve coil and inside of the hazardous environment, the controller coil being wired to the controller.

9. The method of claim 6, further including energizing the controller coil, thereby inducing current flow in the valve coil, thereby operating the valve.

10. A process control valve assembly comprising:
    a process control valve plumbed within a controlled environment;
    one or more sensors located within the controlled environment and configured to receive sensor inputs pertaining to operation of the process control valve;
    a solenoid coil mated to the process control valve and configured to operate the process control valve, the solenoid coil located within the controlled environment;
    a valve coil configured to receive power and transfer that power to the solenoid coil, thereby operating the process control valve, the valve coil located within the controlled environment;
    a controller located in a second environment physically isolated and fluidly separated from the controlled environment and configured to control operation of the process control valve inductively; and
    a controller coil configured to transmit power inductively to the valve coil, the controller coil being wired to the controller located in the second environment outside of the controlled environment;
    wherein the valve coil is further configured to receive at least one data signal representing the input sensor inputs from the one or more sensors and to transfer the data signals inductively to the controller coil.

11. The valve assembly as set forth in claim 10, further including a barrier isolating the valve coil from the controller coil.

12. The valve assembly as set forth in claim 11, wherein the process control valve is configured to be removable without disconnecting the controller coil from the controller.

13. The valve assembly as set forth in claim 10, further including a controller driver connected to the controller coil and configured to invert a direct current signal into an alternating current signal, for wireless transmission to the valve coil.

14. The valve assembly as set forth in claim 13, further including a valve driver connected to the valve coil and configured to rectify the alternating current signal received from the controller coil and thereby energize the solenoid coil to operate the valve.

15. The valve assembly as set forth in claim 10, wherein the data signal includes a position of the valve, including whether the valve is opened, closed, or in transition.

16. The valve assembly as set forth in claim 10, wherein the data signal includes a temperature of the valve.

17. The valve assembly as set forth in claim 10, wherein the data signal includes a flow rate through the valve.

18. The method of claim 1, wherein the hazardous environment is one of: a chemical plant, and a refinery.

* * * * *